G. W. EDWARDS.
Lifting-Jack.
No. 168,005.
Patented Sept. 21, 1875.
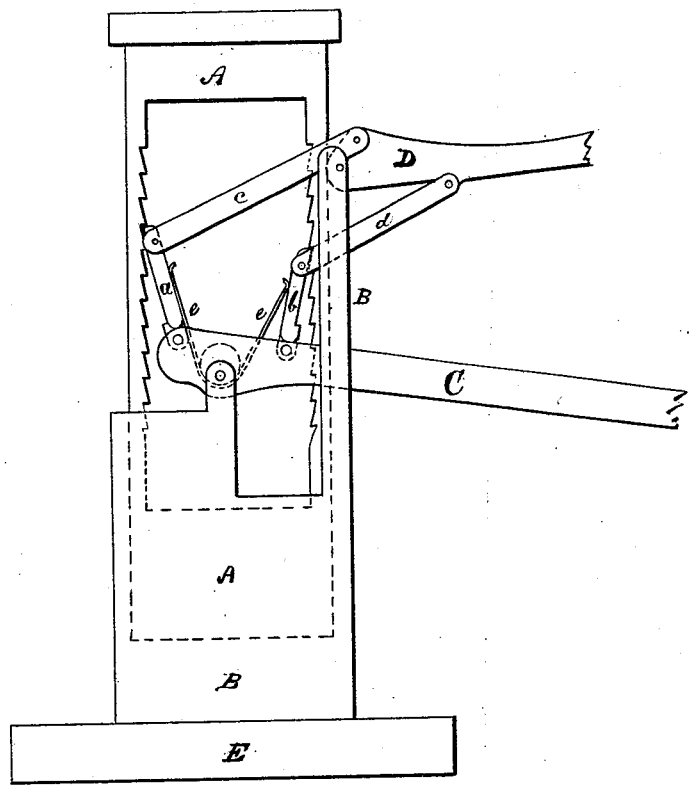

UNITED STATES PATENT OFFICE.

GEORGE W. EDWARDS, OF CHATHAM, NEW JERSEY, ASSIGNOR TO HIMSELF, LEWIS M. ADAMS, AND EZRA CODINGTON, OF SAME PLACE.

IMPROVEMENT IN LIFTING-JACKS.

Specification forming part of Letters Patent No. 168,005, dated September 21, 1875; application filed May 11, 1875.

*To all whom it may concern:*

Be it known that I, GEORGE W. EDWARDS, of the village of Chatham, in the county of Morris and State of New Jersey, have invented certain new and useful Improvements in Lifting-Jacks; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates to certain improvements in the construction and operation of lifting-jacks. The invention consists in the peculiar construction of the lifting-frame, and the mechanism by which it is operated, which will be hereinafter more fully set forth and shown.

In the drawing hereto annexed, A is the lifting frame or jack, which is made to slide up and down in a case or box, B. To the latter are pivoted levers C and D, to the former of which are pivoted dogs $a$ and $b$, which engage with the frame A, which is notched on the inside, for the purpose as shown. Said dogs $a$ and $b$ are connected with the lever D by means of straps $c$ and $d$, which are pivoted at both ends. A suitable spring or springs, $e$, are arranged so as to press against the dogs $a$ and $b$, and to hold them in position.

The lever C moves in a slot in the box or case B, said lever $c$ being also slotted to admit the movement of the frame A, a portion of which passes through it, all as shown or indicated in the drawing.

The apparatus is operated as follows: By pressing downward upon the lever C the frame A is forced upward by means of the dog $a$. At the same time the dog $b$ is drawn downward until it engages with one of the notches in the opposite side of the frame A, when the lever C, being raised, forces the frame still upward and the dog $a$ downward until it engages a notch lower on the opposite side, when the operation is repeated, and so on as far as desired, or to the extent of its raising capacity. By pressing downward upon the lever D the dogs $a$ and $b$ are disengaged from the frame A, and it (the frame) drops by its own weight to the bottom or base E.

Having thus described my invention, what I claim as new, and desire to secure by Letters Patent of the United States, is—

The lifting-jack, consisting of the frame A, case B, levers C D, dogs $a$ $b$, straps $c$ $d$, and spring $e$, when operating substantially as and for the purposes set forth and shown.

In testimony that I claim the foregoing as my own invention I affix hereto my signature in presence of two witnesses.

GEORGE W. EDWARDS.

Witnesses:
LEWIS M. ADAMS,
EZRA CODINGTON.